(12) United States Patent
Moran (10) Patent No.: US 12,061,728 B2
(45) Date of Patent: Aug. 13, 2024

(54) CONTENT DISTRIBUTION INTEGRITY CONTROL

(71) Applicant: Arm IP Limited, Cambridge (GB)

(72) Inventor: Brendan James Moran, Histon (GB)

(73) Assignee: Arm IP Limited, Cambridge (GB)

( * ) Notice: Subject to any disclaimer, the term of this patent is extended or adjusted under 35 U.S.C. 154(b) by 304 days.

(21) Appl. No.: 17/594,977

(22) PCT Filed: Jan. 21, 2020

(86) PCT No.: PCT/GB2020/050135
§ 371 (c)(1),
(2) Date: Nov. 4, 2021

(87) PCT Pub. No.: WO2020/225520
PCT Pub. Date: Nov. 12, 2020

(65) Prior Publication Data
US 2023/0153468 A1  May 18, 2023

(30) Foreign Application Priority Data
May 7, 2019 (GB) ...................................... 1906428

(51) Int. Cl.
*G06F 21/64* (2013.01)
*G06F 21/44* (2013.01)
(52) U.S. Cl.
CPC .............. *G06F 21/64* (2013.01); *G06F 21/44* (2013.01)
(58) Field of Classification Search
CPC .................................. G06F 21/64; G06F 21/44
See application file for complete search history.

(56) References Cited

U.S. PATENT DOCUMENTS

| | | | |
|---|---|---|---|
| 8,793,506 B2* | 7/2014 | Kasatkin | G06F 21/64 713/168 |
| 9,425,953 B2* | 8/2016 | Gulley | G06F 9/30036 |
| 10,348,506 B2* | 7/2019 | Greiner | H04L 9/0631 |
| 10,361,865 B2* | 7/2019 | Hibshoosh | H04L 9/3247 |
| 10,841,099 B2* | 11/2020 | Morgner | G06Q 20/3827 |
| 10,936,729 B2* | 3/2021 | Kumar | H04L 9/0822 |

(Continued)

OTHER PUBLICATIONS

International Search Report and Written Opinion Corresponding to PCT/GB2020/050135, dated Mar. 30, 2020.

(Continued)

*Primary Examiner* — Viral S Lakhia
(74) *Attorney, Agent, or Firm* — DeWitt LLP (57) ABSTRACT

Provided is a technology including an apparatus and a machine-implemented method for operating a content sending apparatus attachable to a network, comprising acquiring a sequence comprising at least two content blocks; generating at least one authentication metadata block comprising at least one signed digest derived by a chaining digest technique from the sequence of content blocks; deriving a content transform encoding for each of the content blocks; and sending the at least one authentication metadata block and at least one content transform encoding to at least one of a set of recipient devices, the at least one device being operable to apply an inverse transformation to the content transform encoding and to authenticate at least one resultant content block according to the authentication metadata block.

18 Claims, 5 Drawing Sheets

(56) References Cited

U.S. PATENT DOCUMENTS

| | | | | |
|---|---|---|---|---|
| 2015/0215114 | A1* | 7/2015 | Alahmad | H04L 9/0643 |
| | | | | 380/44 |
| 2016/0292396 | A1* | 10/2016 | Akerwall | G06F 21/10 |
| 2017/0257762 | A1* | 9/2017 | Ginzboorg | H04W 12/069 |
| 2019/0036906 | A1* | 1/2019 | Biyani | H04L 63/102 |
| 2020/0019421 | A1* | 1/2020 | Sun | H04L 9/50 |
| 2020/0120084 | A1* | 4/2020 | Cheng | G06F 21/31 |
| 2021/0082033 | A1* | 3/2021 | Yao | G06Q 20/405 |
| 2021/0243201 | A1* | 8/2021 | Tandel | H04L 9/0897 |
| 2022/0131874 | A1* | 4/2022 | Waisbard | G06F 21/64 |
| 2022/0345316 | A1* | 10/2022 | Testagrossa | H04L 9/3247 |

OTHER PUBLICATIONS

International Preliminary Report on Patentability Corresponding to PCT/GB2020/050135 dated Nov. 18, 2021.

Combined Search Report and Examination Report Corresponding to GB1906428.6 dated Oct. 4, 2019.

Rosario Gennaro and Pankaj Rohatgi. How to Sign Digital Streams. Technical report, IBM T.J.Watson Research Center, 1997, Published in: Crypto '97 Proceedings of the 17th Annual International Cryptology Conference on Advances in Cryptology, pp. 180-197.

Emanuel Regnath, et al., "LeapChain: Efficient Blockchain Verification for Embedded IoT", Computer-Aided Design, ACM, 2 Penn Plaza, Suite 701 New York, NY, 10121-0701USA, Nov. 5, 2018 (Nov. 5, 2018), pp. 1-8, XP058421051, DOI: 10.1145/3240765. 3240820 ISBN: 978-1-4503-5950-4 Abstract, Introduction, Sections 2-3.

Chieh-Jan Mike Liang, et al., "SIFT", Information Processing in Sensor Networks, ACM, 2 Penn Plaza, Suite 701 New York NY 10121-0701 USA, Apr. 13, 2015 (Apr. 13, 2015), pp. 298-309, XP058069375, DOI: 10.1145/2737095.2737115 ISBN: 978-1-4503-3475-4 Abstract, Sections 1, 3.

Lim Jea-Min, et al., "Chain Veri: Blockchain-Based Firmware Verification System for IoT Environment", 2018 IEEE International Conference on Internet of Things (IThings) and IEEE Green Computing and Communications (GREENCOM) and IEEE Cyber, Physical and Social Computing (CPSCOM) and IEEE Smart Data (Smartdata), IEEE, Jul. 30, 2018 (Jul. 30, 2018), pp. 1050-1056, XP033556441, DOI: 10.1109/CYBERMATICS 2018.2018.00194 [retrieved on May 30, 2019J Abstract, Introduction, Sections II-III.

* cited by examiner

Method 400

CONTENT DISTRIBUTION INTEGRITY CONTROL

The present technology is directed to controlling the integrity of content, particularly encoded content, to be transmitted to receiving electronic devices over a network, especially when untrusted intermediaries may be involved in the transmission process.

In the past, information processing environments were typically isolated from the "real world", secured from interference by physical barriers and lack of electronic connections, and under the control of dedicated professionals with detailed knowledge of system operation, data integrity and system security. Such installations were once kept behind locked doors and tended by trained operators and system programmers; they were often only accessible from dedicated terminal devices which were themselves often kept in secure areas of a plant or office. Updates to data content were usually conducted by selected professionals whose interactions with the systems were filtered through access control lists and passwords, and were often subject to checks and balances such as "buddy-checking", managerial sign-offs, and sometimes long periods of testing and parallel operation to ensure that the correct and secure functioning of the systems was maintained.

In recent years, by contrast, more and more devices are becoming networked and provided with local processing capability; these devices are typically in unprotected environments, open to the world through Internet connections, and under the control of people without any particular training in system operation, integrity and security. Very recently, devices from home computers to vehicles and light-bulbs have begun to acquire these additional functions and to be connected together through the Internet of Things (IoT). With this massive proliferation of networked devices, system security and content integrity present increasingly complex difficulties.

Content, which includes both data and executable instructions, is now typically delivered over networks that are unsecured, such as the Internet, and its handling on arrival is conducted by people without any special knowledge of system operation, integrity and security. Such content is open to accidental and deliberate corruption at all stages from source, through the delivery mechanisms over the network to the receiver device, and this may render the receiver device open to unintended errors and to many kinds of malicious interference.

In a first approach to the many difficulties encountered in controlling the integrity of content to be transmitted to receiving electronic devices over a network, there is provided a technology including an apparatus and a machine-implemented method for operating a content sending apparatus attachable to a network, comprising acquiring a sequence comprising at least two content blocks; generating at least one authentication metadata block comprising at least one signed digest derived by a chaining digest technique from the sequence of content blocks; deriving a content transform encoding for each of the content blocks; and sending the at least one authentication metadata block and at least one content transform encoding to at least one of a set of recipient devices, the at least one device being operable to apply an inverse transformation to the content transform encoding and to authenticate at least one resultant content block according to the authentication metadata block.

In a second approach to the difficulties encountered in controlling the integrity of content to be transmitted to receiving electronic devices over a network, there is provided a technology including an apparatus and a machine-implemented method for for operating a network attachable device, comprising receiving at least one metadata block comprising at least one signed digest derived by a chaining digest technique from a sequence of content blocks; acquiring at least two content transform encodings for a sequentially-preceding one and a sequentially-succeeding one of the sequence of content blocks; applying an inverse transformation to the at least two content transform encodings; and authenticating at least one of the content transform encodings according to the metadata block.

A chaining digest technique is, at its simplest, a technique whereby a stream of data is divided into blocks and each block is processed in turn to append a value derived by applying a transformative function to another, neighbouring block before the output block is transmitted. The value may be referred to as a digest, a hash value or a check value). For example, block B may be processed to append a digest of block A, and block C to append a digest of block B and its appended digest of block A, and so on, in a chained manner, from one end of the stream to the other. The chaining digest technique may be applied forwards or in reverse through a stream of data, according to the particular requirements of the use-case under consideration. This chaining digest technique thus establishes a form of continuous dependency among the blocks in the output stream. As will be clear to one of skill in the art, this description has been much simplified and leaves the treatment of the starting block undefined. In the implementation example given below, one resolution of this matter is shown, although other implementations will be apparent to one of skill in the art.

In a hardware approach, there is provided electronic apparatus comprising logic elements operable to implement the methods of the present technology. In another approach, the computer-implemented method may be realised in the form of a computer program operable to cause a computer system to perform the process of the present technology.

Implementations of the disclosed technology will now be described, by way of example only, with reference to the accompanying drawings, in which:

FIG. 5 shows a system comprising hardware, firmware, software or hybrid components according to a distribution service embodiment of the present technology Content that is to be delivered over a network may comprise data or executable instructions and may be encoded in various ways. In one implementation, content may comprise data encoded in a machine-readable format, and it may comprise data encoded together with structure entities that define the structure to be imposed on the data—for example, a word-processor file may comprise text data encoded in ASCII intermingled with directives that control the presentation of the text data, such as line feed and font change codes. Other content may be distributed in other formats that may be more convenient, for example, formats that use less bandwidth over the signal medium. In one example, a modification to already stored data may be distributed to receivers in the form of transform instructions, so that specified locations in the pre-existing data at the receiver may be modified according to the transform instructions. In another example, content in the form of a delta file may be distributed to receivers, so that receivers can add new data or replace pre-existing data with changed data according to embedded instructions in the delta file. In these examples, the bandwidth occupied by the content is significantly less than if a whole new image of the content were to be transmitted. In yet another example, distribution may be achieved by storing the payload at a network accessible location and sending an address of the location to enable receivers to retrieve the payload according to their own schedule and bandwidth capabilities.

Figure 1:
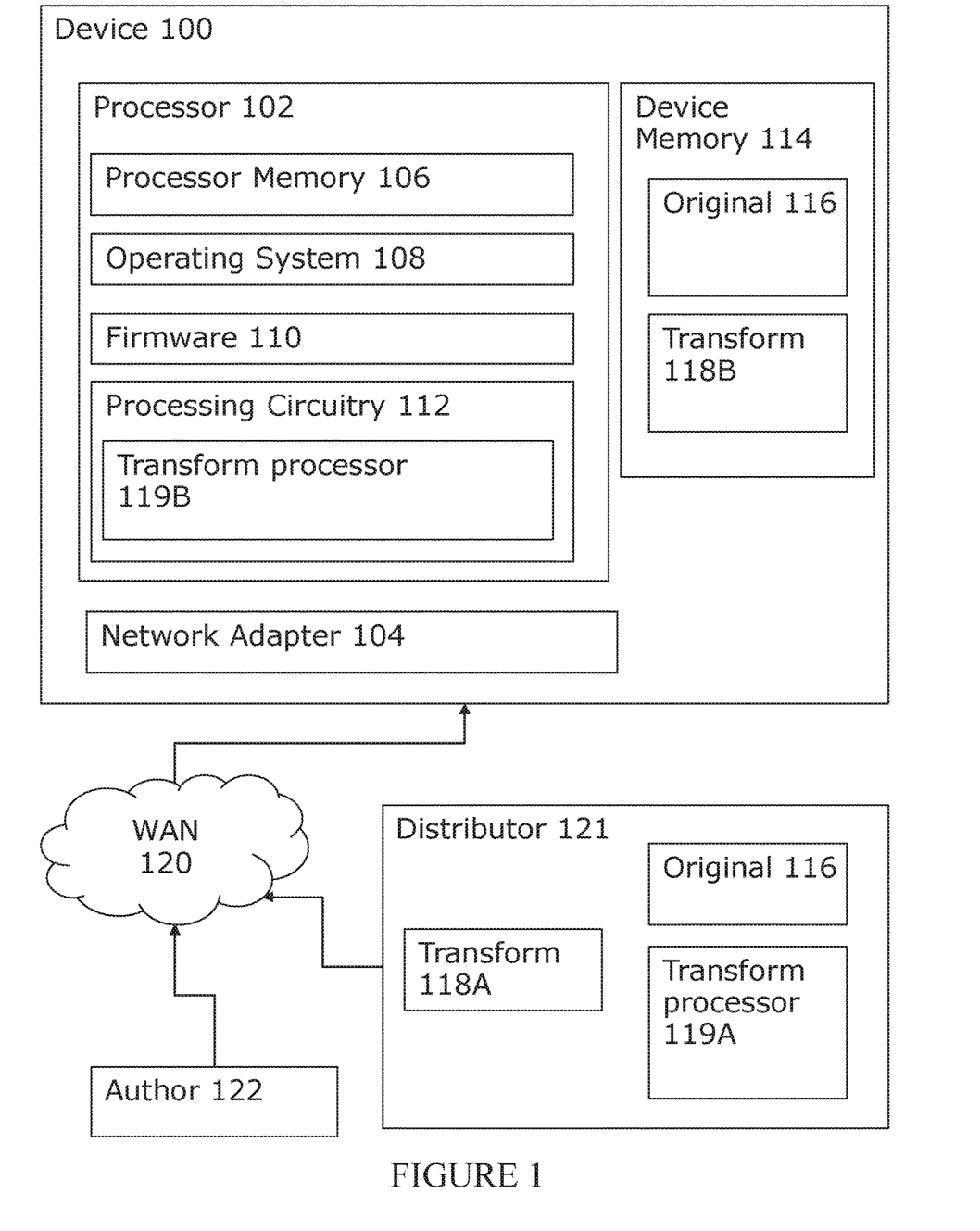
FIG. 1 shows an example block diagram of a deployment of a computer-implemented embodiment of the present technology comprising hardware, firmware, software or hybrid components.

Referring to FIG. 1, an example of a deployment of a computer-implemented embodiment of the present technology is shown. Device 100 is shown in FIG. 1 as being networked with at least Author 122 and Distributor 121, but is also operational with numerous other general purpose or special purpose computing system environments or configurations. Examples of well-known computing processing systems, environments, and/or configurations that may be suitable for use with device 100 include, but are not limited to, gateways, routers, personal computer systems, server computer systems, thin clients, thick clients, hand-held or laptop devices, multiprocessor systems, microprocessor-based systems, set top boxes, programmable consumer electronics (smartphones, smart watches, tablets), network PCs, minicomputer systems, mainframe computer systems, and distributed computing environments that include any of the above systems or devices.

Device 100, Author 122 and Distributor may be described in the general context of computer systems and computer systems on a chip (SoC). Such computer systems comprise executable instructions, such as program modules, being executed by a computer processor. Generally, program modules may include: routines; programs; objects; components; logic; and data structures that perform tasks or implement abstract data types.

Device 100 is connected through a wide area network (WAN) 120 to Author 122 and Distributor 121. Any other type of network can be used including a low power wireless network, but in many embodiments WAN 120 is typically a wired network such as the Internet. In one embodiment, WAN 120 may comprise a cloud computing environment.

Device 100 comprises: processor 102; network adapter 104; and device memory 114.

Processor 102 is for loading machine instructions from device memory 114 and for performing machine operations in response to the machine instructions. Such machine operations include: performing an operation on a value in a register (for example arithmetical or logical operations); moving a value from a register to a memory location directly and vice versa; and conditional or non-conditional branching. A typical processor can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language (such as C) in terms of machine operations.

Network adapter 104 is for enabling communication between Device 100 and other network devices.

Device memory 114 comprises Original 116 content and Transform 118B.

Processor 102 comprises: processing circuitry 112, which in turn comprises Transform processor 119B; firmware 110; operating system 108; and processor memory 106.

Processing circuitry 112 is for processing instructions and comprises: fetch circuitry for fetching instructions; decode circuitry for decoding instructions; and execution circuitry for executing instructions (not shown). Data and program code stored in device memory 114 are accessible to processing circuitry 112, including, for example, Original 116 content and Transform 118B.

Firmware 110 may comprise an operating kernel program for running every other process and environment. Firmware 110 can be embodied in circuitry or program instructions in processor memory 106.

Operating system 108 is the basic system for loading and executing program modules including device applications. Operating system 108 can be embodied in circuitry or program instructions in processor memory.

Processor memory 106 provides the execution environment for processor 102 and space for the program instructions for the firmware 110 and operating system 108.

Author 122 and Distributor 121 are similarly operational with numerous other general purpose or special purpose computing system environments or configurations and are typically computer server systems, comprising similar basic computer components to Device 100 but these are not shown nor described. Distributor 121 further comprises stored Original 116 content, Transform 118A corresponding to Transform 118B of Device 100 and Transform processor 119A corresponding to Transform processor 119B of Device 100. In one possible implementation, Author 122 may be partly or wholly contained within a Hardware Security Module (HSM) for security and authentication.

Transform processor 119A of Distributor 121 is operable to act upon Original 116 to create Transform 118A. Transform Processor 119B of Device 100 is correspondingly operable to act upon original 116 content by applying Transform 118B, as will be described in further detail below.

As will be immediately clear to one of ordinary skill in the art, the separations between components shown in the drawing are not to be taken to mean that other arrangements are excluded from consideration; in implementations of the present technology, components shown here as separate may be combined in higher-level components or implemented in varying physical and logical structures.

In conventional content distribution techniques, it is necessary for the trust anchor of the delivered content encoding to be the same as the trust anchor of the content transform mechanism. This introduces a heavy burden on the content author; namely, the author must store all previous data transforms and must query all devices for their current content image versions in order to construct a correct distribution. Not only this, but if a relevant device that was not online comes online after the authoring of the update, the content author may need to construct a whole new content package for that device. This burden would be better taken on by a dedicated distribution service that could assume responsibility for acquiring and storing relevant data concerning receiver devices and for tailoring and transmitting the encoded content to the receivers, while maintaining the integrity of the content. This is not easily achievable in conventional arrangements because unpacking a content transform, such as a firmware update, is equivalent to installing a payload. This is typically a privileged operation, so a third party cannot conventionally be allowed to do it.

The typical approach to this problem is to provide a manifest of blocks, with the manifest comprising a hash digest of each block, signed by the content author, to the receiver so that the receiver can verify every block prior to writing it. This comes with a stark trade-off: Too many blocks, and the manifest comprising the hash digests will not fit in constrained memory, too few and the individual blocks may not fit in a constrained memory.

For example, a content distribution system which needs to distribute for download a 1 MB firmware image with a 1 kB block size will require 1024 block digests, which means that the manifest takes 32 kB of space, and this in turn means that the receiver device would require 32 kB of RAM or a 32 kB non-volatile buffer. Many devices (especially IoT devices) do not have such a large memory space available. For example, neither 32 kB RAM nor 32 kB buffer space is available on a typical C2 constrained device (as defined in RFC7228). This means that distribution systems using such block manifests are typically unhelpful or counterproductive on constrained devices.

Figure 2:
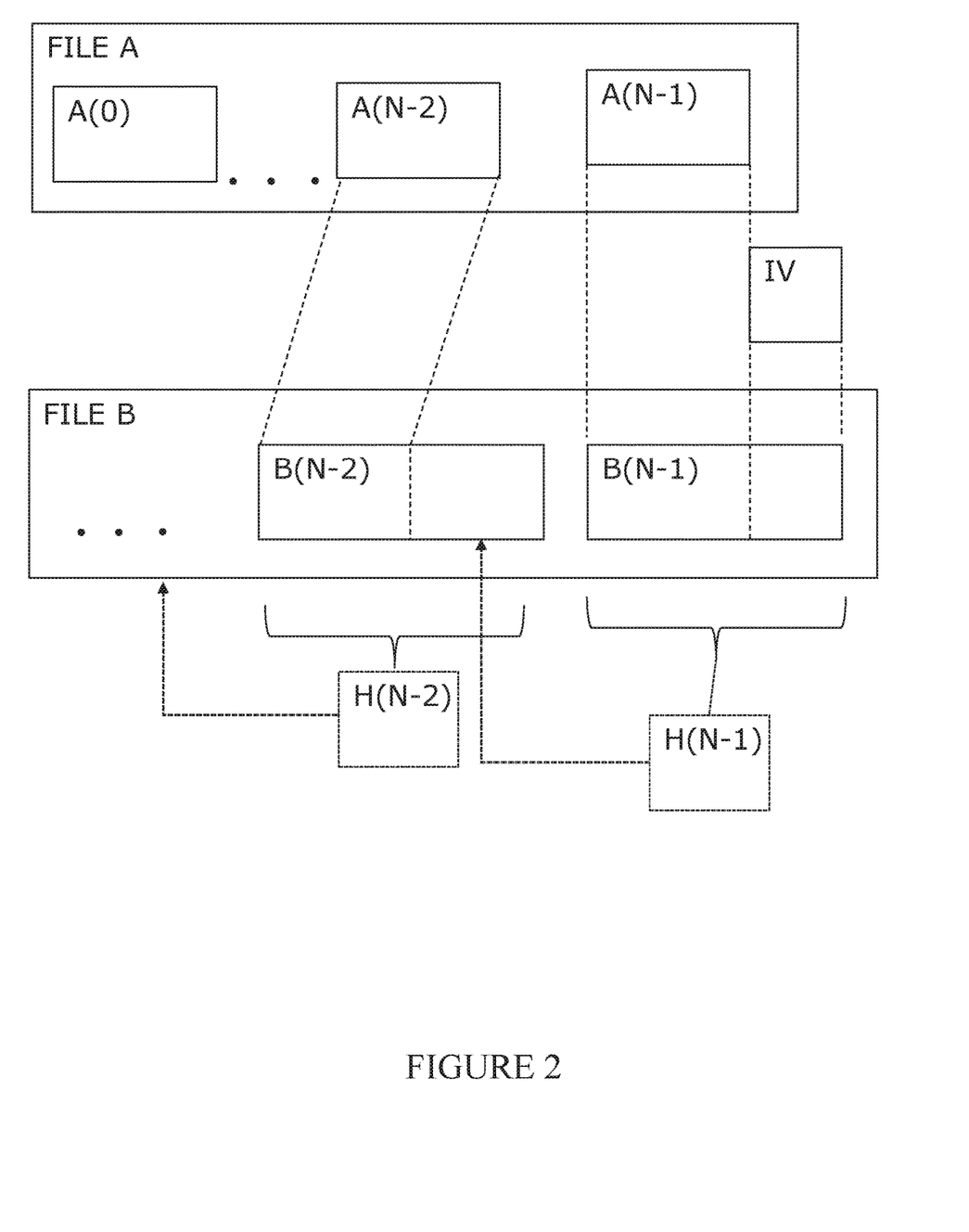
FIG. 2 shows one simple example of an embodiment of a reverse chaining digest.

In an approach to addressing this difficulty, as shown now in FIG. 2, file A may be protected by a serial manifest that is integrated into the data stream as follows:

Suppose there exists a file A, with blocks 0 . . . N−1 .

$$A=\{A[0] \ldots A[N-1]\}$$

Suppose there exists a cryptographic digest function D:

$$H=D(X)$$

A new file, B, is constructed from A as follows:

$$H[x]=D(\{A[x], H[x+1]\})$$

$$H[N-1]=D(\{A[N-1], IV\})$$

$$B[x]=\{A[x], H[x+1]\}$$

$$B[N-1]=\{A[N-1], IV\}$$

where IV is a random number chosen by the signer. This is an optimization that is not strictly necessary. It is not mandatory that the final block has an IV appended, but it makes the code simpler by eliminating the use of special case code for the last block of content. In FIG. 2, A[N−1] has the random value IV appended to produce B[N−1]. B[N−1] then has its digest H[N−1] appended to A[N−2] to create B[N−2] and the combination is in turn processed by the digest algorithm to produce H[N−2], and so on.

Typically, the final digest of the backward chaining process, H[0], will not appear in file B, but it will be signed either directly or it will be placed within a signed container before being transmitted to a receiver device.

In this way, the blocks that re to be distributed are subjected to a backward or reverse chaining process where the final block has appended a random IV, the penultimate block has appended the digest of the final block and the appended IV, the antepenultimate block has appended the digest of the penultimate block and the digest of the final block and the appended IV, and so forth backward to the beginning of the file. The digest created at the completion of this process—H(0)—is the culmination of a cumulative backward chain of blocks and digests and is thus fully determined by the digest algorithm, the file content and the seed value IV.

In a second approach to this process, the value of B may be constructed as follows:

Suppose we construct a block C[x] such that:

$$C[x]=\{H(A[x]), H(C[x+1])\}$$

$$C[N-1]=\{H(A[N-1]), IV\}$$

Then, we construct B such that:

$$1B[x]=\{C[x], A[x]\}$$

This may be more convenient for devices to evaluate, since the digest of each block is used on its own. In the transform, either H(C[x+1]) can be used or C[x] can be used. Skip hashes and Merkle trees apply equally to this embodiment. In a further variant that may prove useful for differential updates, check values that prove more than one content block can be constructed thus:

$$C[x]=\{H(A[x*4]), H(A[x*4+1]), H(A[x*4+2]), H(A[x*4+3]), H(C[x+1])\}$$

Figure 3:
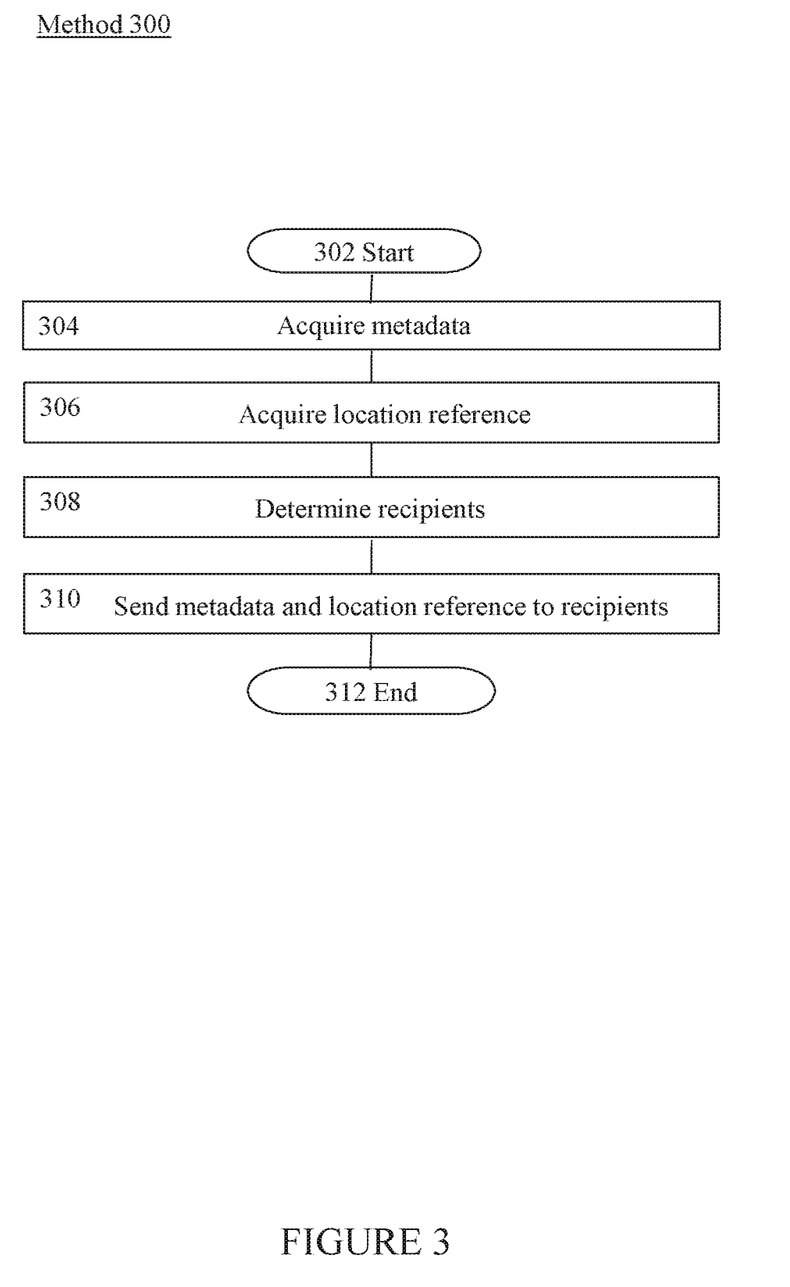
FIG. 3 shows a portion of a method of operation by means of which an embodiment of the presently described technology may be implemented.

FIG. 3 shows a portion of a method 300 of operation of a content sending apparatus attachable to a network, by means of which an embodiment of the presently described technology may be implemented. The method 300 according to the embodiment begins at Start 302, and at 304 the content sending apparatus acquires at least one metadata block comprising at least one signed digest derived by a chaining digest technique from a sequence of content encoding blocks and corresponding block check values. The content sending apparatus may itself be a content author or update authority, or it may be a distribution system acting on behalf of such an author or authority. The chaining digest technique may be as described above, or may comprise one or more of the alternative embodiments and improvements that will be described in detail below.

At 306, the apparatus acquires at least one location reference of a sequence of content encoding blocks and the corresponding block check values. The location reference may comprise a reference to a location in a database accessible from devices attached to a network; in one example, it may comprise a universal resource location (URL) identifier that identifies a resource location on the Internet. At 308, the apparatus determines a set of recipient devices that are operable to authenticate and apply at least one of the sequence of content encoding blocks using the metadata block. The operability of recipient devices may be determined based on various measures of capability or capacity, such as processing power or the storage space available. The set of all possible recipient devices may be subdivided into subsets wherein some subsets may be operable to authenticate and apply certain content encoding blocks, while other subsets are not. At 310, the apparatus sends the at least one metadata block and the at least one location reference to at least one of the set of recipient devices. The method 300 according to this implementation completes at End 312. It will be clear to one of ordinary skill in the art that the method 300 described may be iterative, and that thus the End step 312 merely terminates a single iteration of the method 300, which may be repeated as often as is necessary.

Figure 4:
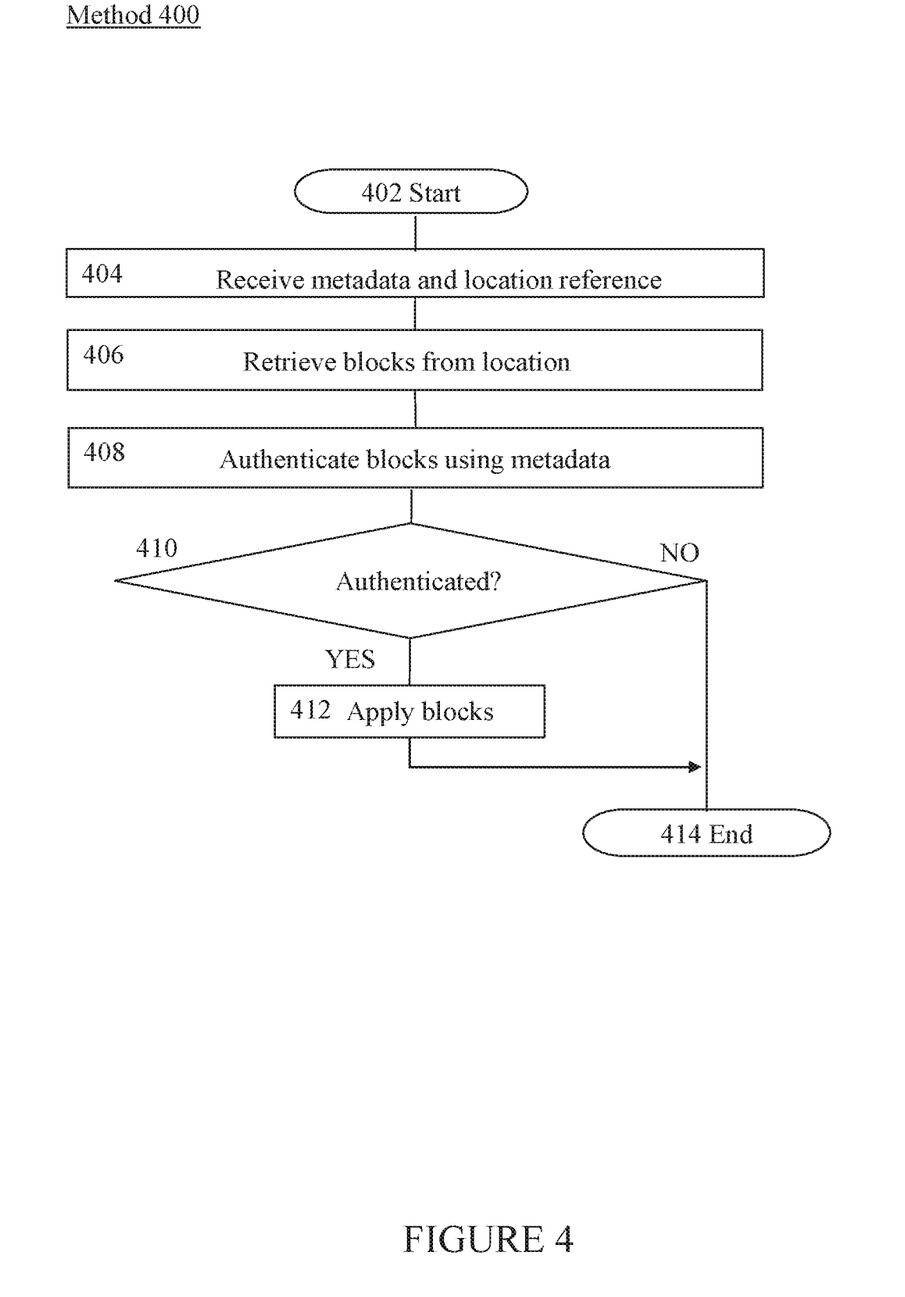
FIG. 4 shows a further portion of a method of operation by means of which an embodiment of the presently described technology may be implemented.

FIG. 4 shows a further portion of a method 400 of operation of a network attachable device by means of which method an embodiment of the presently described technology may be implemented. In FIG. 4, the method 400 commences at Start 402. At 404, the network attachable device receives at least one metadata block comprising at least one signed digest derived by a chaining digest technique from a sequence of content encoding blocks and corresponding block check values. The chaining digest technique may be as described above, or may comprise one or more of the alternative embodiments and improvements that will be described in detail below. At 404, the network attachable device also receives at least one location reference giving the location of the sequence of content encoding blocks and the corresponding block check values. The location reference may comprise a reference to a location in a database accessible from devices attached to a network; in one example, it may comprise a universal resource location (URL) identifier that identifies a resource location on the Internet.

At 406, the network attachable device retrieves the sequence of content encoding blocks and the corresponding block check values by way of the location reference. At 408 the network attachable device authenticates at least one of the sequence of content encoding blocks according to the metadata block. If the authentication fails at test step 410, the blocks are not authenticated, and thus should not be applied; the process completes at End 414. It will be clear to one of ordinary skill in the art that the method 400 described may be iterative, and that thus the End step 414 merely terminates a single iteration of the method 400, which may be repeated as often as is necessary.

If test step 410 provides a positive authentication, the blocks are valid and at 412, the network-attachable device applies the content encoding blocks. The process then completes at End 414. It will be clear to one of ordinary skill in the art that the method 400 described may be iterative, and that thus the End step 414 merely terminates a single iteration of the method 400, which may be repeated as often as is necessary.

The implementation described above may be expressed in another way:

$$B[N-1]=\{A[N-1], IV\}$$

$$B[N-2]=\{A[N-2], D(B[N-1])\}\ldots$$

$$B[1]=\{A[1], D(B[2])\}$$

$$B[0]=\{A[0], D(B[1])\}$$

In the output file, it is possible in some implementations to omit some digests, requiring the receiver to verify several blocks at once. For example, in a file A, with 5 blocks, it might be legitimate, in some cases, to omit several block digests, as follows:

$$A=\{A[0]\ldots A[4]\}$$

$$H[x]=D(\{A[x], H[x+1]\})$$

$$H[4]=D(\{A[4], IV\})$$

Omitting several hashes, we construct another file C:

$$C[0]=\{A[0], H[1]\}$$

$$C[1]=A[1]$$

$$C[2]=A[2]$$

$$C[3]=\{A[3], H[4]\}$$

$$C[4]=\{A[4], IV\}$$

H[0] is signed and delivered separately. To verify file C, the receiver performs these operations:
1. Receive H[0] and validate its signature
2. Receive C[0]
3. Compute D(C[0]) and compare it to H[0]
4. Store H[1] as the last trusted hash
5. Receive C[1 . . . 3]
6. Compute H[3]=D(C[3])
7. Compute H[2]=D({C[2], H[3]})
8. Compute D({C[1], H[2]}) and compare it to H[1] (this validates C[1 . . . 3])
9. Store H[4] as the last trusted hash
10. Receive C[4]
11. Compute D(C[4]) and compare it to H[4].

In a slightly different approach, blocks can be any desirable size, provided that both the size and hash of the next block is appended to each block:

$$B[x]=\{A[x], size(A[x+1]), D(A[x+1])\}$$

A further optimization of such an implementation can be made by including more than one hash at the end of each block. Several arrangements are possible, including skipped blocks and Merkle Trees. A Merkle tree is a tree in which every leaf node is labelled with the hash of a data block and every non-leaf node is labelled with the cryptographic hash of the labels of its child nodes. Skipping blocks is an important optimization since it allows missing blocks to be re-requested while the sequence continues. Skipped blocks and Merkle trees are fundamentally different, since Merkle trees are true trees, whereas skipped blocks are non-tree graphs.

In a block-skipping variant, a block-skip file is constructed according to these rules:
Suppose there is a file A, with blocks 0 . . . N−1.

$$A=\{A[0]\ldots A[N-1]\}$$

Suppose there is a cryptographic digest function D:

$$H=D(X)$$

A new file, B, can be constructed from A as follows:

$$H[x]=D(\{A[x], H[x+1], H[x+2]\})$$

$$H[N-2]=D(\{A[N-2], H[N-1], IV\})$$

$$H[N-1]=D(\{A[N-1], IV, 0\})$$

$$B[x]=\{A[x], H[x+1], H[x+2]\}$$

$$B[N-2]=\{A[N-2], H[N-1], IV\}$$

$$B[N-1]=\{A[N-1], IV, 0\}$$

where IV is a random number chosen by the signer. In this way, blocks can be skipped during the process, and then requested in a later iteration of the process.

In the variant described earlier, the block hash may be computed separately, thus:

$$H[x]=D(\{D(A[x]), H[x+1], H[x+2]\})$$

Instead of applying serial manifests to a data file, it is also possible to apply them to the result of a transform that creates a data file; in one exemplary case, differential updates or deltas to an original content file, where instructions for modifying and inserting new data and the new data itself are contained in the blocks of the delta. This provides a way of updating pre-existing content by modifying or replacing only selected data according to the instructions provided in the blocks of the delta.

In such an implementation, the serial manifest's intermediate hashes are integrated into the command stream generated by the differential compressor. This creates a variety of new use-cases that were not possible in either conventional differential compression or in conventional serial manifests.

To explain this technique, a trivial differential compression algorithm FONS with four operations will be used (although it will be abundantly clear to one of ordinary skill in the art that this is much simpler than any "real-life" arrangement):

1) Fill with pattern (F: (length, pattern))
2) Copy from original (O: (length, source offset))
3) Copy from new (N: (length, source offset))
4) Copy from stream (S: (length, data))

The original file O is the file that will be operated upon. The new file N is the file that will be created by processing the command stream.

F duplicates pattern until it fills length bytes.

O copies length bytes, starting at source offset in the original file/memory.

N copies length bytes, starting at source offset in the output file/memory.

S copies length bytes, from data, which immediately follows S in the command stream.

For example, assume an 8 kB file, with 1 kB blocks. The desired outcome is to update 1 byte at offset 512 in block 4 and set it to 0. The command stream would be:

O(4608, 0), F(1, 0), O(3583, 4609)

To process this stream, the recipient copies 4608 bytes from the original file, starting at offset 0, and writes it into the new file. Next the recipient writes '0' into the new file, starting where the last operation left off. Finally, the recipient copies 3583 bytes from original, starting at offset 4609, and writes them into the new file, starting where the last operation left off.

If a fifth instruction, H, meaning "specify next digest", is added to the FONS set of commands described above, the blocks become individually verifiable by the FONSH algorithm, provided that they are verified in order. The algorithm becomes:

1. Fill with pattern (F: (length, pattern))
2. Copy from original (O: (length, source offset))
3. Copy from new (N: (length, source offset))
4. Copy from stream (S: (length, data))
5. Specify the "Next Digest" (H: (digest))

where H specifies the next digest that is expected. H must always occur on a block boundary. Block size is specified either in the previous block or as a file or system parameter.

For the previous example, the command stream becomes:
H(md0), O(1024, 0), H(md1), O(1024, 1024), H(md2), O(1024, 2048), H(md3), O(1024, 3072), H(md4), O(512, 4096), F(1,0), O(511, 4609), H(md5), O(1024, 5120), H(md6), O(1024, 6144), H(md7), O(1024, 7168), H(mdIV)
To process this stream, the recipient:
1) loads the expected digest for block 0 (md0) into the expected digest variable
2) loads 1024 bytes of the original file, starting at offset 0, into the write buffer
3) loads the expected digest for the next block (md1 on the first pass) into the next digest variable
4) computes the digest of the write buffer and the next digest variable, concatenated together
5) compares this with the expected digest variable
   a. Fails on mismatch
6) writes the write buffer to the new file
7) repeats 2-5 until 4096 bytes have been written, incrementing the offset in 2 by 1024 each time
8) loads 512 bytes of the original file, starting at offset 4096, into the write buffer
9) sets byte 512 of the write buffer to 0
10) loads 511 bytes of the original file, starting at offset 4609 into the write buffer
11) loads the expected digest for the next block (md5) into the next digest variable
12) computes the digest of the write buffer and the next digest variable, concatenated together
13) compares this with the expected digest variable
   a. Fails on mismatch
14) writes the write buffer to the new file
15) loads 1024 bytes of the original file, starting at offset 5120, into the write buffer
16) loads the expected digest for the next block (md1 on the first pass) into the next digest variable
17) computes the digest of the write buffer and the next digest variable, concatenated together
18) compares this with the expected digest variable
   a. Fails on mismatch
19) writes the write buffer to the new file
20) repeats 15-19 until 8192 bytes have been written in total, incrementing the offset in 15 by 1024 each time This approach allows block-by-block verification of the output of the command stream but it takes a substantial amount of data, requiring 9 commands and 9 digests to pack a 1-byte change.

It may be desirable to optimize this approach for sparse updates. For example, as will be clear from the above description, it is desirable to avoid writing to flash memory in the receiving device anything that has not been fully verified. In one implementation, an avenue of optimization is open: only when the first F or S command appears is it necessary to add a next digest command. This is because all information necessary to validate the preceding blocks is already stored on the device and need not be held in RAM. This makes the command stream much shorter:
H(md0), O(4608, 0), F(1, 0), O(511, 4609), H(md5), O(3072, 5120), H(mdIV)

This packs the 1-byte update into 4 commands and 3 digests, a much more modest amount of data than required by the previous approach.

To process this command stream, the recipient:
1) loads the expected digest for block 0 (md0) into the expected digest variable
2) advances to the next H command (md5)
3) loads the expected digest for the next block (md5) into the next digest variable
4) constructs the previous 1024-byte block
   a. loads 511 bytes of the original file, starting at offset 4609 into the write buffer, starting at offset 513
   b. sets byte 512 of the write buffer to 0
   c. loads 512 bytes of the original file, starting at offset 4096, into the write buffer, at offset 0
5) works backwards to establish trust in the command sequence
   a. computes the digest (md4) of the write buffer and the next digest variable, concatenated together
   b. computes the digest (md3) of 1024 bytes of the original file, starting at offset 3072, concatenated with the following digest (md4)
   c. computes the digest (md2) of 1024 bytes of the original file, starting at offset 2048, concatenated with the following digest (md3)
   d. computes the digest (md1) of 1024 bytes of the original file, starting at offset 1024, concatenated with the following digest (md2)

e. computes the digest (md0) of 1024 bytes of the original file, starting at offset 0, concatenated with the following digest (md1)
f. compares the calculated md0 to the expected md0.
6) having validated the command sequence up to md5, the recipient now processes each command up to H(md5) as normal. Optionally, the recipient can store the intermediate digests to guard against time of check to time of use (TOCTOU) threats.
7) advances to the next H command (mdIV)
8) loads the expected digest for the next block (mdIV) into the next digest variable
9) works backwards to establish trust in the command sequence:
   a. computes the digest (md7) of 1024 bytes of the original file, starting at offset 7168, concatenated with the following digest (mdIV)
   b. computes the digest (md6) of 1024 bytes of the original file, starting at offset 6144, concatenated with the following digest (md7)
   c. computes the digest (md5) of 1024 bytes of the original file, starting at offset 5120, concatenated with the following digest (md6)
   d. compares the calculated md5 to the expected md5
10) having validated the command sequence up to mdIV, the recipient now processes each command up to H(mdIV) as normal. Optionally, the recipient can store the intermediate digests to guard against TOCTOU threats.

Normally, a differential compression engine must be configured to set up the block sizes that it uses. In this case, the engine can extract that information from the serial manifest descriptor.

Where the construction of the differential update is the most important factor, it is possible to construct a serial manifest that uses minimally-sized blocks. The differential compression engine can then omit most intermediate digests, selecting only those that are needed for the compression algorithm's outputs, allowing optimisation for the algorithm, rather than for the manifest.

Where a data stream needs to be transformed by a third party (such as a content/delta distribution service) and later reconstructed, this mechanism can be used to ensure that the third party does not tamper with the stream. This can be achieved according to the above-described implementations by creating a differential compression service that allows update authors to hand over the mechanics of differential compression to a third party, while removing any possibility that the third party can tamper with the compressed image.

This can result in dramatic power savings and security improvement, particularly in the case of a compromised third party. The third party cannot cause the targeted device to write to flash even a single invalid block, despite being able to author the whole differential compression stream.

In this implementation, the present technology can be used to produce a delta command stream to update pre-existing content (for example, firmware on a device) as follows:

Suppose there exists a file A, with blocks 0 ... N−1.

$$A=\{A[0] \ldots A[N-1]\}$$

Suppose there exists a digest function D:

$$H=D(X)$$

We construct a new file, B, from A as follows:

$$B[x]=\{A[x], D(B[x+1])\}$$

$$B[N-1]=\{A[N-1], IV\}$$

where IV is a random number chosen by the signer.
Expressed in another way, $$B[N-1]=\{A[N-1], IV\}$$

$$B[N-2]=\{A[N-2], D(B[N-1])\}\ldots$$

$$B[1]=\{A[1], D(B[2])\}$$

$$B[0]=\{A[0], D(B[1])\}$$

Now, we construct a further transformed image from this new file:
[D(B[0])]
[C0] ... [CA]D(B[1])][CA+1] ... [CB]D(B[2]) ... [CZ ... CN−1] ... D(B[IV])
Where:
D(B[0]) is the signed hash of A's blocks in reverse order;
C0 ... CA are the delta commands needed to create block A[0] of file A;
CA+1 ... CB are the delta commands needed to create block A[1] of file A;
B0 ... N−1 are the precursors for A0 ... N−1 in order to obtain D(B[0]); and
IV is a random number chosen by the signer.

The workflow of a delta distribution service according to this implementation is as follows:
1. The firmware update authority creates a new firmware image.
2. The firmware update authority randomly selects an IV, then works backwards using a backward chaining digest technique in the manner described above to calculate the final digest of the serial manifest, md0.
3. The firmware update authority discards all intermediate digests, keeping only the IV and md0.
4. The firmware update authority creates a metadata block for the firmware, including the serial manifest final digest (md0) and the IV and signs the metadata block with its digital signature.
5. The firmware update authority uploads the firmware to a repository where previous firmware images are stored.
6. The firmware update authority sends the metadata block to a service for distribution to recipient devices.
7. The distribution service queries devices for their current firmware versions.
8. The distribution service extracts those firmware versions from the firmware repository.
9. The distribution service creates a stream delta, but it adds the serial manifest hashes for the final payload to the delta stream, to create a secure delta stream.
10. The distribution service creates a serial manifest to protect the stream delta as well.
11. Optionally, in implementations, the distribution service may create its own signed metadata block, referencing the firmware update authority's metadata. This block contains the serial manifest final digest for the stream delta.
12. The distribution service sends the firmware update authority's metadata along with the distribution service's metadata to each recipient device.
13. Each recipient device processes and authenticates both metadata blocks.

14. Each recipient device follows the process as set out in the description of the optimized implementation above to unpack the stream delta, while protecting the device from manipulation of the stream by the distribution service.

Using the above technique, in combination with any of the hereinbefore described optimisations, thus provides a system and method of operation that provides control of the integrity of content at the point of use of that content, whether the content is supplied in the form of data or in the form of instructions for transforming pre-existing data at the recipient device. In the latter case, the payload that needs to be transmitted over the network to the recipient device is typically much smaller than would be required if the whole content needed to be delivered.

Figure 5:
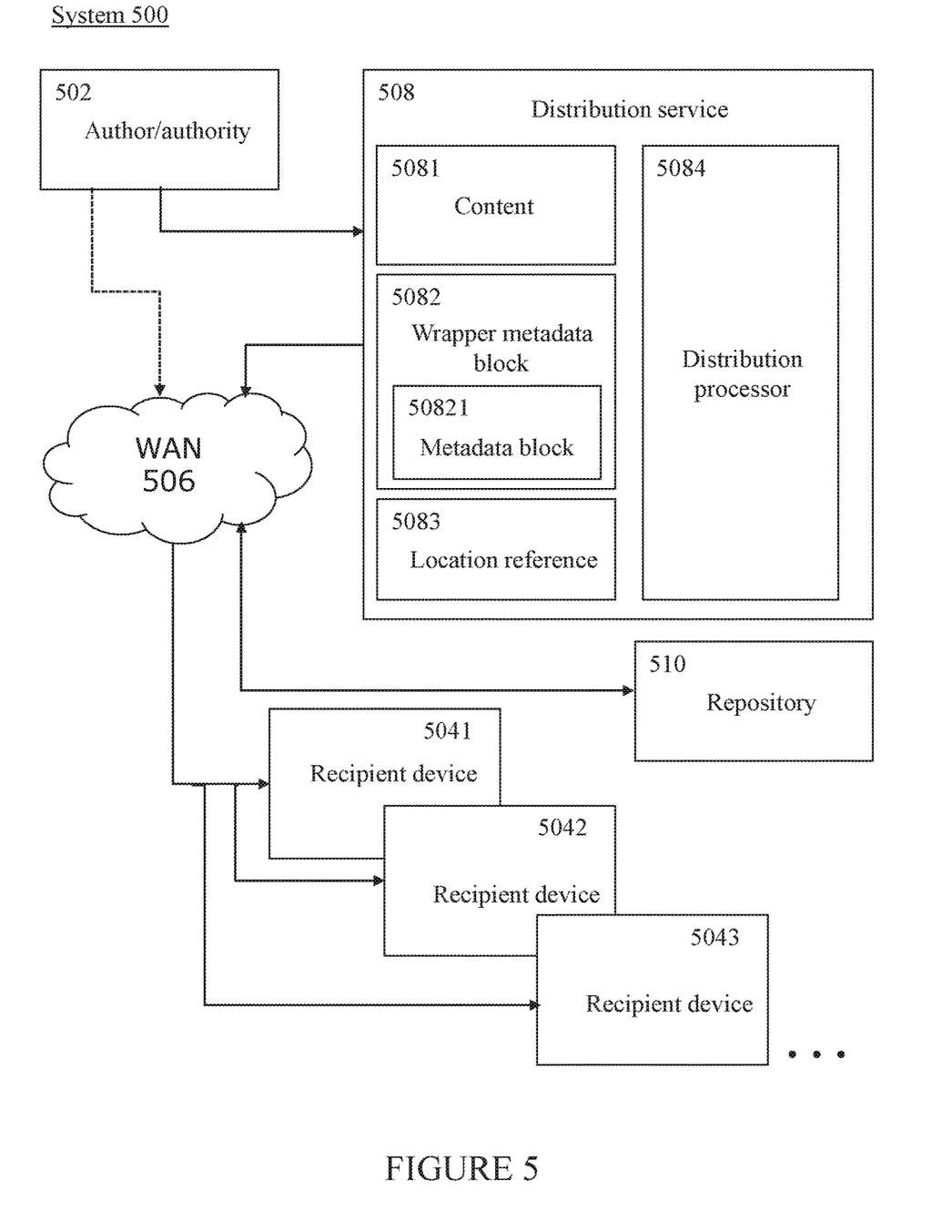

A system 500 comprising hardware, firmware, software or hybrid components according to a distribution service embodiment of the present technology is shown in FIG. 5. System 500 comprises an Author/authority 502, which may be a source of original content or a source of authorised updates. Author/authority 502 is in electronic communication, either via some direct channel or using WAN 506, with Distribution service 508. Any type of network can be used including a low power wireless network, but in many embodiments WAN 506 is typically a wired network such as the Internet. In one embodiment, WAN 506 may comprise a cloud computing environment. Distribution service 508 is in electronic communication via WAN 506 with Recipient devices 5041, 5042, 5043 . . . . Distribution service 508 is further in electronic communication via WAN 506 with Repository 510, which is operable to hold images of content.

Distribution service 508 comprises a copy of Content 5081 which may comprise data or instructions, such as delta instructions for causing updates to pre-existing content to be performed when executed in a suitable environment, such as one or more of Recipient devices 5041, 5042, 5043 . . . . Content 5081 and Metadata block 50821 are received by Distribution service 508 from Author/authority 502 and are then processed by Distribution processor 5084 to provide Wrapper metadata block 5082 and Location reference 5083. Location reference 5083 refers to content location within Repository 510. Distribution service 508 is operable to transmit Wrapper metadata block 5082, itself containing Metadata block 50821, and Location reference 5083 to Recipient devices 5041, 5042, 5043 . . . via WAN 506. Recipient devices 5041, 5042, 5043 . . . are operable to receive the transmission from Distribution service 508, to use. Location reference 5083 to retrieve content thereby located within Repository 510, and to use Wrapper metadata block 5082 and Metadata block 50821 to authenticate the content.

In a further variant of a distribution service implementation, in the case of blocks that are not of a fixed size, the creator of the content would conventionally need to send either all the block digests or the list of block sizes to the distribution service. If, however, the content author or update authority could make use of a further service or an extension of the distribution service to calculate the required block sizes so as to optimise them according to their content, then the eventual payload size of the content delivery could be yet further reduced. In this implementation, the service could return the block sizes that it recommends back to the content author or update authority, which could then compute the block digests according to the block sizes recommended. This variant allows for the creation of smaller transforms (deltas) by allowing the content provider to select block sizes that align well with the selected transform. For a delta transform, for example, this could mean using very large block sizes for areas with no changes, but small block sizes for areas that do contain changes.

In a yet further variant of this implementation, a repository may hold not merely a single copy of a firmware image, but a set of firmware images each created by a backup operation. Any subsequent delta transformation may then be assessed against each of the backup versions and used either to select a best candidate to act a source copy for the delta, or to be applied to all suitable versions.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product tangibly embodied in a non-transient computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause the computer system or network to perform all the steps of the method.

In a further alternative, an embodiment of the present technique may be realized in the form of a data carrier having functional data thereon, the functional data comprising functional computer data structures to, when loaded into a computer system or network and operated upon thereby, enable the computer system to perform all the steps of the method.

It will be clear to one skilled in the art that many improvements and modifications can be made to the foregoing exemplary embodiments without departing from the scope of the present technique.

The invention claimed is:

1. A machine-implemented method for operating a content sending apparatus attachable to a network, comprising:
   acquiring a sequence comprising at least two content blocks;
   generating at least one authentication metadata block comprising at least one signed digest derived by a chaining digest technique from said sequence of content blocks;
   deriving a content transform encoding for each of said content blocks, the content transform encoding comprising delta information to create a modified image from a pre-existing image; and
   sending said at least one said authentication metadata block and at least one said content transform encoding to at least one of a set of recipient devices, said at least one device being operable to apply an inverse transformation to said content transform encoding and to authenticate at least one resultant content block according to said authentication metadata block.

2. The machine-implemented method of claim 1, said chaining digest technique comprising a reverse chaining technique starting at an end block of said sequence of content blocks.

3. The machine-implemented method of claim 2, said reverse chaining digest technique comprising appending an initialization seed to said end block.

4. The machine-implemented method of claim 1, said chaining digest technique comprising including in a first sequentially-preceding block authentication data for a second sequentially-succeeding block.

5. The machine-implemented method of claim 4, said chaining digest technique comprising appending to a first sequentially-preceding block at least one digest of a second sequentially-succeeding block.

6. The machine-implemented method of claim 1, said content transform encoding comprising transform instructions.

7. The machine-implemented method of claim 1, said sending said at least one said content transform encoding comprising making said content transform encoding available at a location and sending an address of said location.

8. A content sending apparatus attachable to a network, comprising:
a first networking component operable to acquire a sequence comprising at least two content blocks;
   a metadata component operable to create at least one authentication metadata block comprising at least one signed digest derived by a chaining digest technique from said sequence of content blocks;
   a transform component operable to derive a content transform encoding for each of said content blocks, the content transform encoding comprising delta information to create a modified image from a pre-existing image;
   a device addressing component operable to determine a set of recipient devices operable to apply an inverse transformation to said content transform encoding and to authenticate
at least one resultant content block according to said authentication metadata block; and
   a second networking component operable to send said authentication metadata block and at least one said content transform encoding to at least one of said set of recipient devices.

9. The apparatus of claim 8, said chaining digest technique comprising a reverse chaining technique starting at an end block of said sequence of content blocks.

10. The apparatus of claim 8, said chaining digest technique comprising including in a first sequentially-preceding block authentication data for a second sequentially-succeeding block.

11. The apparatus of claim 8, said content transform encoding comprising transform instructions.

12. The apparatus of claim 11, said transform instructions comprising compression instructions and/or content modification instructions.

13. The apparatus of claim 11, said transform instructions comprising content modification instructions.

14. The apparatus of claim 8, said second networking component being operable to send said at least one said content transform encoding comprising a component operable to make said content transform encoding available at a location and sending an address of said location.

15. A computer program comprising computer readable code to, when loaded into a computer and executed thereon, cause said computer to perform the method according to claim 1.

16. A system comprising a content author device, a network attachable device operable to apply content transform encoding, and the content sending apparatus according to claim 1.

17. A machine-implemented method for operating a network attachable device, comprising:
   receiving at least one metadata block comprising at least one signed digest derived by a chaining digest technique from a sequence of content blocks;
   acquiring at least two content transform encodings for a sequentially-preceding one and a sequentially-succeeding one of said sequence of content blocks, the content transform encoding comprising delta information to create a modified image from a pre-existing image;
   applying an inverse transformation to said at least two content transform encodings; and
   authenticating at least one of said content transform encodings according to said metadata block.

18. A computer program comprising computer readable code which, when loaded into a computer and executed thereon, causes said computer to perform the method according to claim 17.

* * * * *